Nov. 26, 1968     J. R. BRITT     3,413,096
CONVERTER-MUFFLER
Filed Dec. 23, 1965
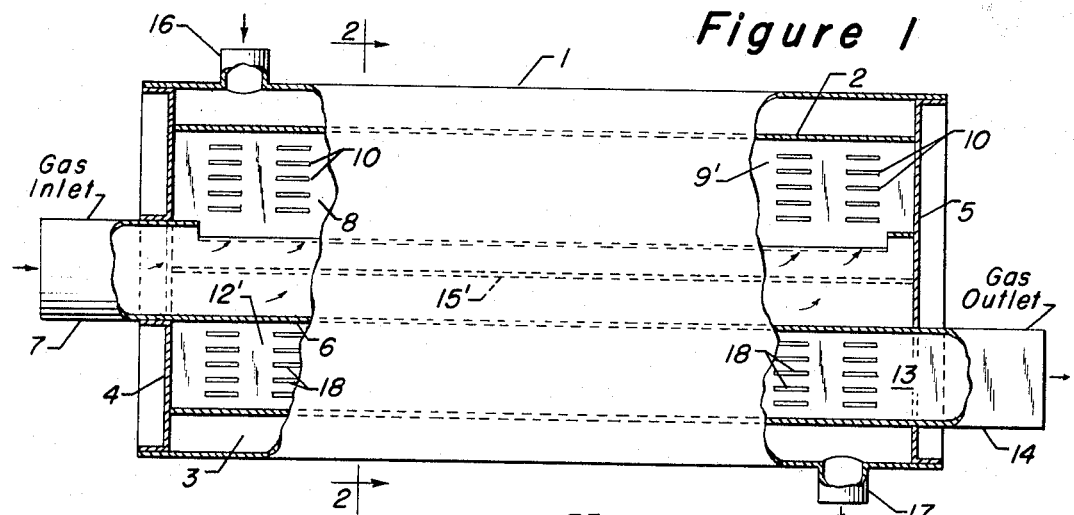
Figure 1
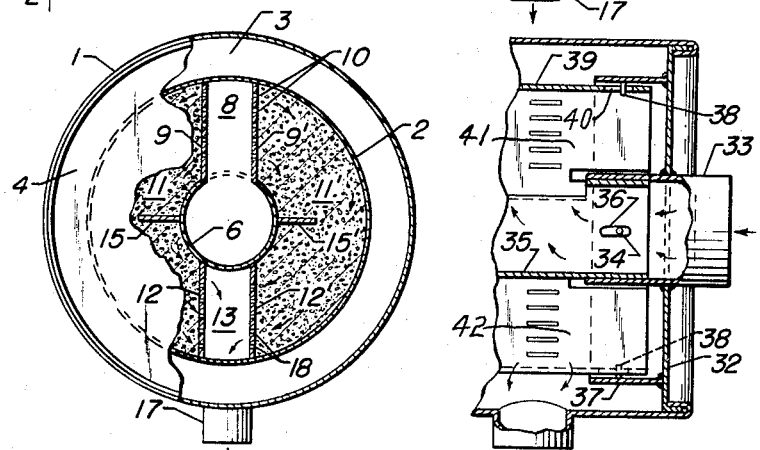
Figure 2
Figure 3
Figure 4
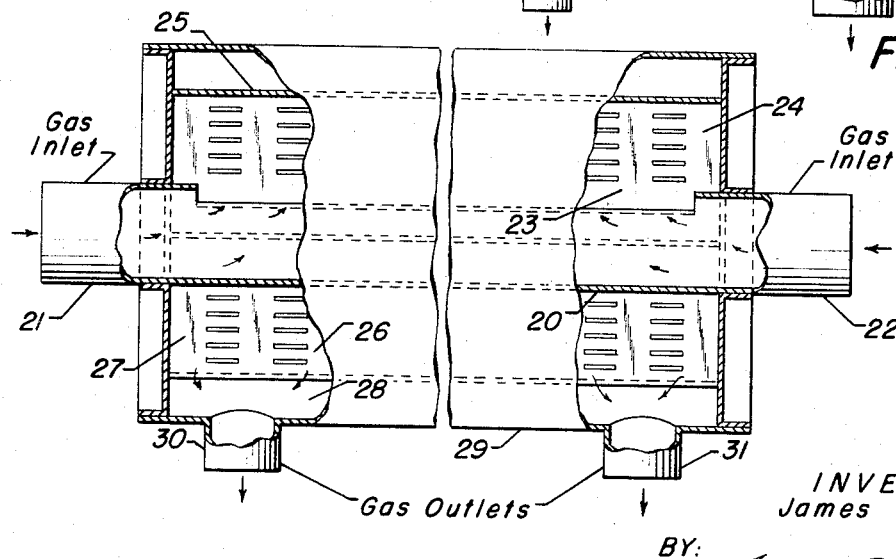
INVENTOR:
James R. Britt
BY:
*James R. Hootson Jr.*
*Philip T. Liggett*
ATTORNEYS United States Patent Office 3,413,096
Patented Nov. 26, 1968

3,413,096
CONVERTER-MUFFLER
James R. Britt, Arlington Heights, Ill., assignor to Universal Oil Products Company, Des Plaines, Ill., a corporation of Delaware
Filed Dec. 23, 1965, Ser. No. 515,917
6 Claims. (Cl. 23—288)

ABSTRACT OF THE DISCLOSURE

A catalytic muffler designed to prevent channeling or bypassing of the bed by the exhaust gases in the event that the bed suffers loss in depth from attrition or settling.

---

This invention relates to an improved form of converter-muffler adapted to hold a bed of solid contact material to treat an exhaust gas stream. More specifically, the present device provides for the catalytic conversion and purification of the exhaust gases from an internal combusion engine, with the utilization of a design which overcomes flow channeling and/or bypassing of catalyst particles in a bed, in the event that there is some settling or loss of catalyst from the unit.

The desirability of removing or converting the noxious compounds of vehicular exhaust gases has been generally well established. Such exhaust gases contain one or more components as unburned hydrocarbons, carbon monoxide, nitrogen oxides, sulfur compounds, partially oxidized products, etc., in various concentrations, and part of all of these components contribute to the smog problem presently facing various geographical areas of the United States and other countries.

In order to overcome the problem of smog and of atmospheric contamination, it has been proposed to use "afterburners" or various catalytic devices in the exhaust gas system of a vehicle in order to overcome the contamination problem. In the catalytic operation, the hot gases issuing from the motor exhaust manifold are mixed with a quantity of secondary or combustion air and the resulting mixture passed through a catalyst bed maintained within a conversion zone so as to effect a more or less complete oxidation of the carbon monoxide and unburned hydrocarbons present in the exhaust stream. The use of a catalytic method and apparatus also provides for the initiation of the oxidation reaction at lower temperatures than might otherwise be possible, and effectively eliminates the need for igniting means which is generally used with most types of "afterburners" or other apparatus which depend strictly upon thermal conversion conditions.

For catalytic converters, the catalyst is used in subdivided particle form, such as spheres, cylinders, or pellets and is generally placed in one or more suitable catalyst retaining sections providing for uniform gas flow therethrough. However, it is not intended to limit the present invention to the use of any one type of catalyst or catalyst composition, since there are various new improved catalyst composites available which will maintain an efficient operation for relatively long periods of time. One of the problems of certain converter designs has been the maintenance of a good efficient contact with the catalyst particles because of catalyst loses from breakage or because of settling which in turn may permit gas channeling and a bypassing of the main bed of particles.

It is thus a principle object of the present invention to provide a converter design and arrangement which will permit some catalyst settling and/or losses without the use of a reservoir section and at the same time will substantially preclude exhaust gas bypassing through the bed.

Briefly, this invention provides a catalytic converter-muffler unit for exhaust gases, which comprises in combination, an elongated confined housing having an axially positioned gas receiving conduit, gas inlet means to such conduit, spaced apart perforate partitioning members extending substantially vertically upward from said conduit to the interior wall of said housing and forming an upper elongated gas distributing section, open passageway means in said gas receiving conduit providing for gas flow to said gas distributing section, additional spaced apart perforate partitioning members extending substantially vertically downward from the outside of said gas conduit to the interior wall of said housing, with such additional perforate members forming therebetween a treated gas collection section as well as forming along with first said perforate partitioning members two separated and opposing particle retaining sections for holding beds of subdivided catalyst, and gas outlet means through said housing from said gas collection section whereby gas treated in passage through the catalyst from said distributing section is discharged from the unit.

In general, the present converter-muffler unit will be of a cylindrical or oval cross-section and elongated so that it results in a configuration which is similar to that of present types of auto exhaust mufflers. Also, generally, the present improved design for the converter will require no greater length than conventional forms of mufflers.

The perforate partitioning members which define the internal gas distributing and gas collecting sections as well as the catalyst retaining sections, may be of suitable strong, rigid forms of wire mesh or they may be of perforate sheet metal. Inasmuch as the catalyst retaining sections will provide for the further oxidation of the various oxidizable components remaining in the exhaust gas stream being treated, there may be relatively high temperature exothermic reactions taking place so as to have resulting temperatures that may be well above 1000° F. In view of the high temperature conditions, it is preferable to utilize high temperature resistant alloy steel metals for the partitioning members and other interior metals that are directly in contact with the catalyst, although it is not intended to limit the present design to any specific construction materials.

The perforations in the partitioning members which define the catalyst retaining section will of course be sized in relation to the type of catalyst particles which are to be maintained in the apparatus. Typically, the catalyst particles, whether in the form of spheres, cylinders or pellets, will have a dimension of about $\frac{1}{16}''$ to about $\frac{1}{4}''$, although particles of larger or smaller dimensions may be utilized where deemed desirable. Mixed sizes of catalysts may also be used and be of advantage in certain instances. In introducing the catalyst into the interior of the unit, care should be taken to be sure that the catalyst particles are uniformly packed within all portions of the bed in order to provide a resulting substantially uniform resistance to gas flow therethrough. As noted hereinbefore, it is not intended to limit the present invention to any one type of catalyst; however, suitable oxidation catalysts include the metals or sub-groups I, V, VI and VIII of the Periodic Table, particularly copper, silver, vanadium, chromium, iron cobalt, nickel and platinum. These components may be used singly or in combination with one or more other components. Generally, the active catalytic component will be composited with an inorganic refractory oxide base such as alumina, silica-alumina, silica-alumina-zirconia, silica-thoria, alumina-boria and the like.

The design and construction of the present converter unit, as well as further advantageous features thereof may be better set forth and explained by reference to the accompanying drawing and the following description thereof.

FIGURE 1 of the drawing is a sectional view through one embodiment of the present improved form of converter-muffler.

FIGURE 2 of the drawing is a cross-sectional view through the embodiment of FIGURE 1, as indicated by the line 2—2 therein.

FIGURE 3 of the drawing indicates still another modified embodiment of the converter-muffler unit.

FIGURE 4 of the drawing shows, in a partial sectional view, a sliding internal construction to accommodate high temperature expansion of the catalyst section.

Referring now particularly to FIGURES 1 and 2 of the drawing, there is shown cylindrically shaped converter unit having an outer casing or shell 1 which is spaced concentrically around an inner housing 2 so as to provide an annular space 3 therebetween. The unit is provided with suitable end members 4 and 5 so as to effect resulting gas-tight chambers with the shell 1. Extending axially and longitudinally through the center portion of the converter is an open-ended gas receiving conduit 6, having an inlet end 7, so that an incoming exhaust gas stream to be treated may be distributed throughout the entire length of the unit.

As best shown in FIGURE 2 of the drawing, the upper portion of conduit 6 is slotted or entirely cut away to provide gas flow into a distributing section 8 existing between spaced apart substantially vertical perforate partitioning members 9 and 9'. The latter extend from the conduit 6 to the inside wall of the housing 2 and are each provided with a multiplicity of slots 10 or other perforations such that there may be a two way gas flow into catalyst retaining sections 11 and 11'. Extending downwardly from the lower surface of conduit 6, in a spaced apart manner, there are also perforate partitioning members 12 and 12' which define a longitudinal gas collection section 13 as well as provide lower wall means for the catalyst retaining sections 11 and 11'. At least one treated gas outlet port, such as outlet means 14 through the end wall section 5 which, as shown in FIGURE 1, is provided longitudinally from the gas collecting section 13 whereby there may be a continuous discharge of the contacted gas stream from the converter unit.

For a catalytic converter-muffler, a suitable oxidation catalyst material will be packed into each of the particle retaining sections 11 and 11' so that there may be a catalytic conversion of the exhaust gas stream passing through the unit. Thus, it will be seen from the drawing that the gas flow enters the axially positioned gas receiving conduit 6, then passes upwardly through the distribution zone 8 to flow by way of slots 10 into the respective upper portions of each of the catalyst beds in the confined sections 11 and 11'. The gas flow, upon being split and entering the latter zones, will then feed downwardly through each bed of particles to ultimately be discharged through the openings 18 in partitions 12 and 12' and thence enter the gas collecting section 13 from which it is discharged by way of outlet 14.

It will be noted that by the use of this internal partitioning arrangement, there can be no bypassing of the catalyst beds in each of the catalyst sections 11 and 11', even though there may be catalyst breakage and losses or some settling of particles within each section. In fact, the volume of catalyst in each section can be reduced by 50% or slightly more, for as long as the upper level of the catalyst in each of the retaining sections 11 and 11' is above the upper extremities of partitioning plates 12 and 12' there can be no total bypassing of catalyst as the exhaust gas stream flows from the distributing zone 8 to the gas collecting zone 13.

A preferred form of operating converter unit of course maintains catalyst sections substantially full of particles so that there is an adequate efficient contact of the exhaust gas stream during its reversing downward flow. A preferred form of converter construction also embodies the utilization of one or more longitudinal ribs or baffle members, such as 15 and 15' extending radially from conduit 6 within the respective catalyst sections 11 and 11'. The baffle members 15 and 15' serve to force the gas flow away from the surface of the central conduit member 6 so that there is a longer more uniform flow path for the exhaust gas stream in effecting the contact of catalyst particles in each section.

Various operational and construction features may readily be embodied in combination with the present type of converter. For example, a modified form of converter-muffler unit may embody a heat exchange section in the annular space 3, as provided by the design shown in FIGURES 1 and 2, whereby a separate air stream, or other heat exchange medium, may pass in indirect heat exchange relationship with the outside wall of the housing 2. Since the catalyst retaining sections 11 and 11' may well build up considerable heat from the exothermic reactions taking place therein, it is of advantage to effect the cooling of such section. At the same time there can be useful heat produced in the unit. Thus, there may be air or other fluid introduced through port means 16 to section 3 and a resulting heated stream withdrawn from port means 17 which is usable for vehicle heating purposes or, alternatively can be discharged to the atmoshpere as merely a means for cooling the internal housing 2.

With reference to FIGURE 3 of the drawing, there is shown a slightly modified design and construction where there is an open-ended conduit member 20. The latter thus provides inlet ports 21 and 22 at each end thereof whereby there may be a more uniform introduction of the gaseous exhaust stream into a distributing section 23 between spaced perforate member 24 within a housing 25. The cross-section of the embodiment of FIGURE 3 would of course be similar to that shown in FIGURE 2 of the drawing wherein the gas flow is split and passed in a reverse downward flow through two opposite catalyst retaining sections to ultimately enter a gas collecting section 26 between spaced perforate plate members 27. However, in the present embodiment there is a plenum section 28 in open communication with the gas collecting section 26, with such plenum section 28 being an open annular space around the housing 25 by virtue of a confining casing or shell 29. The gas discharge from plenum section 28 may be accomplished by suitable gas outlet means, such as ports 30 and 31, which are indicated as extending downwardly from the shell 29. On the other hand suitable outlet ports may be provided from the upper or end portions of casing 29 such that they are not in direct alignment with the gas collecting section 26.

It will be noted in connection with the embodiment of FIGURE 3, that there is no circumscribing heat exchange section inasmuch as the annular space 28 is used for receiving the flow of the treated exhaust gas stream; however, it appears that there are certain acoustical advantages of the present arrangement in that the gas flow leaving the collecting space 26 can expand and split laterally in a two-way direction into the annular space 28 prior to being discharged by way of port means 30 and 31. Where desired, a portion of the annular space 28, or separate tubular passageway means, may be partitioned to provide a heat exchange section in combination with a treat gas plenum section.

With reference to FIGURE 4 of the drawing there is illustrated one desirable and preferred form of construction where at least one end of the outer housing, such as 32, is provided with a slip-fit means to permit longitudinal expansion of the internal catalyst section. Such construction will preclude the hot catalyst section from buckling or rupturing the end of the converter casing during operation of the unit where internal temperatures can be quite high. In this embodiment, the end of housing 32 is provided with an inlet sleeve 33 which projects inwardly into the unit for a short distance and has one or more pin members 34 projecting from the inner face of this internal portion. The sleeve 33 holds the end of the internal gas distributing pipe section 35 in a slip-fit manner and in addition the latter has elongated slot means 36 to fit over the pin means 34 to in turn prevent any turning or misalignment of the internal catalyst section. Also projecting inwardly from the end portion 32 is a ring or sleeve section 37, with spaced pin means 38, which is sized to provide a slip-fit for the outer periphery of the wall or housing 39 of the catalyst section. Here again, there can be slot means 40 in the end wall portion of the catalyst housing 39 to fit around the pin means 38 to further assist in the positioning and alignment of the entire catalyst section in the outer casing. The vertical perforate plate partitioning members 41 and 42 can be slotted to pass around the inlet sleeve section 33, or alternatively the construction can be modified to have the conduit section 35 slip over the sleeve 33. This latter arrangement would preclude the need for slots in the partitions 41 and 42 to take care of longitudinal expansion during high temperature operating conditions.

It will of course be realized that the present drawings are merely diagrammatical and that there may be many methods of effecting the connections or assembly of the various portions of the converter unit, such as by welding, roll seams, etc. and that it is not intended to limit the present invention to any particular form of construction. Also, the various gas inlet and outlet port means may be placed in varing positions, including ports through the end members of the unit as well as from any portion or portions of the sides of the housing and casing.

Still further, although not shown in the drawing, suitable layers of insulating material may be advantageously used around the catalyst sections of the unit, as well as around the outlet ports so as to preclude harmful heat transfer to adjacent areas. Although various cross-sectional designs may be utilized in effecting the design of the present form of converter-muffler unit, it should of course be pointed out that any such unit should necessarily be mounted in combination with a vehicle, or in any fixed location, so that the partitioning members defining the catalyst retaining sections are substantially vertical whereby there will be a downward flow of the exhaust gas stream or streams and a preclusion of any flow channeling or bypassing in effecting a contact with the particulated material. In other words, as long as the gas distributing and gas collecting sections are positioned in a more or less vertical alignment and there is a down flow of gas through the particles there can be considerable settling and/or loss of catalyst particles within the respective sections and there is no need for catalyst reservoir sections or other means to maintain fully packed conversion zones. Also, in any modified design there may be provided removable plugs in suitably located fill-ports, whereby subdivided contact particles may be readily placed within or withdrawn from the catalyst sections of the converter unit.

I claim as my invention:

1. A catalytic converter-muffler unit for exhaust gases, which comprises in combination, an elongated confined housing having an axially positioned gas receiving conduit, gas inlet means to said conduit, spaced apart perforate partitioning members extending substantially vertically upward from said conduit to the interior wall of said housing and forming an upper elongated gas distributing section, open passageway means in said gas receiving conduit providing for gas flow to said gas distributing section, additional spaced apart perforate partitioning members extending substantially vertically downward from the outside of said gas conduit to the interior wall of said housing, with such additional perforate members forming therebetween a treated gas collection section as well as forming along with first said perforate partitioning members two separated and opposing particle retaining sections for holding beds of subdivided catalyst, and gas outlet means through said housing from said gas collection section whereby gas treated in passage through the catalyst from said distributing section is discharged from the unit.

2. The converter-muffler unit of claim 1 further characterized in that an outer casing encloses said housing at a spaced distance providing an annular gas plenum section therearound, said treated gas collection section communicates directly with said plenum section, and said gas outlet means connect with the latter section.

3. The converter-muffler unit of claim 1 further characterized in that a gas inlet means is provided to each end of said gas receiving conduit from the respective ends of the unit.

4. The converter-muffler unit of claim 1 further characterized in that longitudinal baffle means extend radially outwardly along the outer side wall portions of said gas receiving conduit within each of said particle retaining sections, whereby to preclude channeling of gas flow directly adjacent said conduit.

5. The converter-muffler unit of claim 1 further characterized in that an outer casing encloses said housing at a spaced distance providing an annular shaped heat exchange section around at least a portion of said housing, and fluid inlet and outlet port means to said casing provide for the heating of a heat exchange medium therein.

6. The converter-muffler unit of claim 1 further characterized in that at least one end portion of said outer casing is provided with inwardly projecting sleeve means to have a slip-fit with said axial gas receiving conduit and to have a slip-fit with the end of the periphery of said confined housing, and pin and slot means are provided between said sleeve means and said confined housing to maintain alignment of the particle retaining sections in said unit.

References Cited

UNITED STATES PATENTS

| | | | |
|---|---|---|---|
| 3,041,149 | 6/1962 | Houdry | 23—288.3 |
| 3,167,400 | 1/1965 | Fisher | 23—288.3 |
| 3,168,806 | 2/1965 | Calvert | 23—288.3 X |
| 3,186,807 | 6/1965 | Bolek | 23—288.3 |
| 3,223,491 | 12/1965 | Maillie et al. | 23—288.3 |
| 3,290,121 | 12/1966 | Malkiewicz | 23—288.3 |

JOSEPH SCOVRONEK, *Primary Examiner.*